Feb. 11, 1930.  J. SCHIFTER  1,746,683
OUTLET STRAINER
Filed Oct. 31, 1928

INVENTOR
John Schifter
BY Aaron L. Applebaum
ATTORNEY

Patented Feb. 11, 1930

1,746,683

UNITED STATES PATENT OFFICE

JOHN SCHIFTER, OF NEW YORK, N. Y.

OUTLET STRAINER

Application filed October 31, 1928. Serial No. 316,213.

The invention relates to outlet strainers of the type shown and described in my previously granted Patents No. 1,596,894, issued August 24, 1926, and No. 1,618,679, issued February 22, 1927, of which the present invention is an improvement.

The object of my invention is to provide a device including a strainer and valve or plug adapted to be inserted in outlets of basins, tubs and the like, to control the flow of water therefrom and to serve as a strainer for the outlet.

In carrying out my invention, I provide a base member having a valve seat, a perforated casing connected with the base and containing a valve or plug to close against said seat, and a movable member supported in position to move said valve or plug from its seat and retain it unseated for straining purposes and to cause said valve or plug to be seated to close the outlet.

A continued object of my invention is to provide a perforated outlet, shell or casing having a normally closed valve or plug which may be opened and held in a locked open position by a partial rotation of said valve or plug relative to the shell or casing.

To enable others skilled in the art to more fully comprehend the underlying features of my invention and its advantages when applied in connection with plumbing equipment generally, reference is had to the accompanying drawing showing a preferred form of the invention in which—

Figure 1:
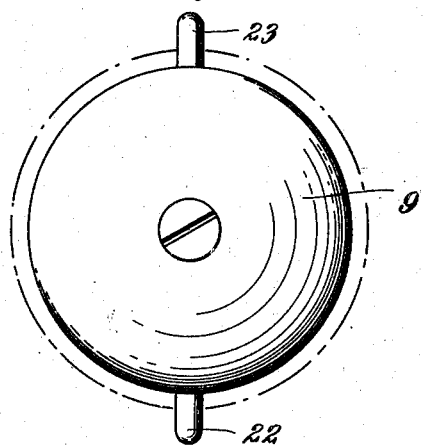
Fig. 1 is a top plan.
Figure 3:
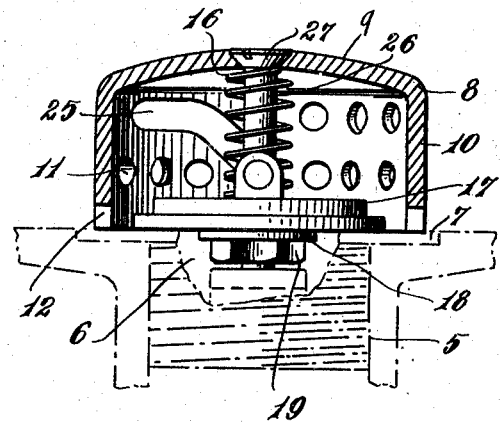
Fig. 3 is an interior view showing the valve, the strainer being shown in section.
Figure 2:
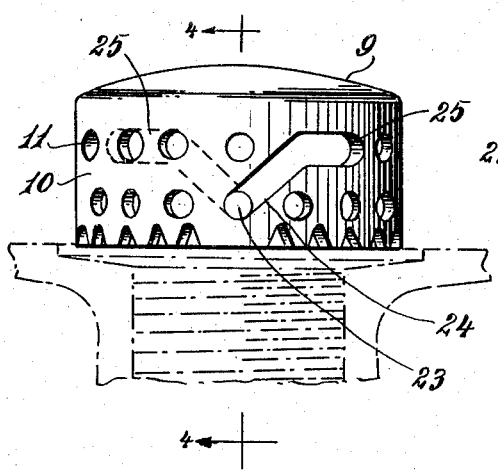
Fig. 2 is a side view.

Referring now to the drawings, I have shown my outlet strainer when employed in connection with standard plumbing equipment such as a tubular, internally threaded fitting 5 in an outlet 6 of a basin, tub, sink or the like. The fitting provides a seat for the strainer and valve or plug constituting my invention and which will now be described in detail.

Seated on the flange 7 of the outlet, I provide an annular shell or casing 8 having a plane top curved surface 9 which may be perforated if so desired as shown in my patents above referred to. The vertical wall 10 of the shell or casing is formed with a series of perforated drainage openings 11 for the passage of water. The bottom edge of the shell or casing is partially serrated to provide a series of openings 12 for the same purpose.

Within the shell or casing is a vertically movable, circular valve or plug member 13 having a top and bottom hollow boss 14, 15 preferably integral therewith, the top boss forming a seat for the lower end of a coil spring 16 interposed between the top of the shell or casing and the valve or plug. On the bottom of said valve or plug is a rubber or fiber disk 17 fastened thereto by a washer 18 and lock nut 19 threaded to the lower boss 15. The diameter of the disk 17 is such as to fit over the outlet opening to seal the same and prevent the passage of water when the plug or valve is closed.

Figure 4:
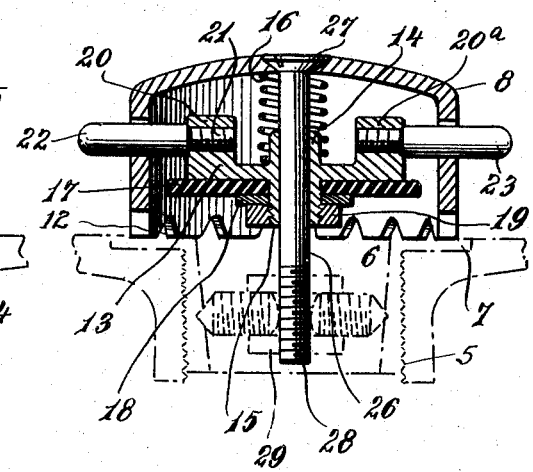
Fig. 4 is a section taken on the line 4—4 of Fig. 2.

Referring particularly to Fig. 4, it will be noted that the valve or plug is provided with a pair of opposed lugs 20, 20$^a$, which are internally threaded, horizontally and threaded to said lugs are the threaded ends 21 of a pair of pins 22, 23, which extend through cam slots or openings in opposite sides of the shell or casing, said pins constituting the movable members for said valve or plug.

The cam slots or openings in the opposite sides of the shell or casing provide means for locking the plug in its raised or elevated position and as shown, extend in opposite directions so that upon a partial rotation of the plug, the pins will ride upwardly on the angular slope or wall 24 and within the horizontal portion or notch 25 of the slot which locks the pins. As the pins ride upwardly in the slots, the coiled spring is slightly compressed by the valve or plug and by a reverse partial rotation, the spring forces the valve downwardly on the seat, closing the outlet opening.

In actual practice, I have found that a cam slot having a pitch of substantially 45 degrees is highly satisfactory for this purpose, being easy to operate against the resistance of the coil spring. However, it will be understood that a bayonet slot or other cam slots may be employed to accomplish the same purpose.

Various means may be employed to lock the shell or the outlet fixture and as illustrative of one form, I prefer to employ a lock or fastening means as illustrated in my Patent No. 1,618,679. Briefly the locking means consists of a threaded screw 26 extending through the plug or valve, the head 27 of said screw being countersunk in the top of the shell or casing. The plug or valve is adapted to freely slide upon the screw from the normally closed to its open position. The lower threaded end 28 of the screw is threaded to a block 29. The block is internally threaded to receive a right and left hand threaded pin, the outer pointed end of said pins being adapted to bite into the metal of the outlet fitting when said pins are rotated by a tool designed for that purpose.

The operation of the outlet strainer will be briefly described. When the shell or casing is locked in position over the outlet, the coil spring tends to maintain the valve closed or in its normal position. When it is desired to raise the valve, a partial rotation of the pins connected to the valve or plug causes the same to rise and the continued movement of the pins into the horizontal portion of the slots locks the valve in its open position. At this point, the spring is under compression so that when the pins are partially rotated in the reverse direction, the spring throws the valve back to its initial locked position over the outlet opening.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention what I claim as new and desire to secure by Letters Patent is:—

1. An outlet strainer comprising a perforated casing, a valve for closing an outlet and an operative member carried by said valve extending through the wall of said casing for simultaneously raising and locking said valve by a partial rotation thereof.

2. An outlet strainer comprising a perforated casing, a normally closed valve adapted to be seated over an outlet, and an operative member carried by said valve extending laterally through the wall of said casing for simultaneously raising and locking said valve by a partial rotation thereof.

3. An outlet strainer comprising a perforated casing, a movable valve for closing an outlet, means for guiding the valve toward and from the outlet and operative members for said valve extending through the wall of the casing for actuating said valve by a partial rotation thereof relative to said casing.

4. An outlet strainer comprising a perforated casing, a movable valve for closing an outlet, a spring between the valve and the top of the casing, means for guiding the valve toward and from the outlet, and opposed operative members for said valve extending laterally through the wall of the casing for actuating said valve by a partial rotation thereof against the spring and relative to the casing.

5. An outlet strainer comprising a perforated casing, a movable valve adapted to be seated over an outlet, means for guiding the valve toward and from the seat, an operative member connected to said valve extending through the wall of the casing, and means for locking said operative member and valve in its raised position by a partial rotation of said valve.

6. An outlet strainer comprising a perforated casing, a movable valve for closing an outlet, a single means for guiding said valve toward and from the outlet and connecting said strainer to the outlet, an operative member connected to said valve and extending laterally through the wall of the casing and means for locking said operative member and valve in its open position by a partial rotation of said valve.

7. An outlet strainer comprising a perforated casing, a movable valve for closing an outlet, means for guiding said valve toward and from the outlet, opposed operative members connected to said valve extending through slots in opposite sides of the casing, said operative members being adapted to lock the said valve in its raised position by a partial rotation thereof relative to the casing.

8. An outlet strainer comprising a perforated casing, a movable valve for closing an outlet, means for guiding said valve toward and from the outlet, a pair of pins connected to said valve extending through cam slots in opposite sides of the casing, said pins being adapted to lock the said valve in its raised position by a partial rotation thereof relative to the casing.

9. An outlet strainer comprising a perforated casing, a movable valve for closing an outlet, means for guiding said valve toward and from the outlet, a spring interposed between the valve and top of the casing for maintaining said valve in its normally closed position, a pair of pins connected to said valve extending through cam slots in opposite sides of the casing, said pins being adapted to raise and lock said valve by a partial rotation thereof relative to the casing.

10. An outlet strainer comprising a perforated casing, a movable valve for closing an outlet, a disk attached to the bottom of the valve, a spring interposed between the valve and top of the casing, a pair of opposed pins connected to lugs on the sides of the valve, said pins extending through cam slots in the opposite walls of the casing and adapted to be locked in a notch in the upper portion of the slot by a partial rotation of said valve relative to the casing.

In testimony whereof I affix my signature.

JOHN SCHIFTER.